United States Patent [19]

Galt et al.

[11] 4,078,904

[45] Mar. 14, 1978

[54] PROCESS FOR FORMING HYDROGEN AND OTHER FUELS UTILIZING MAGMA

[75] Inventors: John K. Galt; Terrence M. Gerlach; Peter J. Modreski; Clyde J. M. Northrup, Jr., all of Albuquerque, N. Mex.

[73] Assignee: The United States of America as represented by the United States Department of Energy, Washington, D.C.

[21] Appl. No.: 727,823

[22] Filed: Sep. 28, 1976

[51] Int. Cl.$^2$ ............................ C10J 5/00; C01B 1/08
[52] U.S. Cl. .................................. 48/197 R; 48/209; 60/641; 423/657; 423/658
[58] Field of Search ............... 48/197 R, DIG. 6, 209; 423/657, 658; 165/45; 60/641

[56] References Cited

U.S. PATENT DOCUMENTS

| 3,615,298 | 10/1971 | Benson | 423/658 |
|---|---|---|---|
| 3,640,336 | 2/1972 | Dixon | 165/45 |
| 3,734,184 | 5/1973 | Scott | 48/DIG. 6 |
| 3,805,885 | 4/1974 | Huisen | 165/45 |
| 3,858,397 | 1/1975 | Jacoby | 165/45 |
| 3,967,675 | 7/1976 | Georgu | 165/45 |

OTHER PUBLICATIONS

"This Changing Earth", Matthews, National Geographic, Jan. 1973, pp. 1, 5, 26.
McGraw-Hill Encyclopedia of Science & Technology, vol. 14, pp. 404-409, 1971.

Primary Examiner—Richard V. Fisher
Assistant Examiner—Peter F. Kratz
Attorney, Agent, or Firm—Dudley W. King; Robert Southworth, III; Robert W. Weig

[57] ABSTRACT

The disclosure relates to a method for extracting hydrogen from magma and water by injecting water from above the earth's surface into a pocket of magma and extracting hydrogen produced by the water-magma reaction from the vicinity of the magma.

8 Claims, 10 Drawing Figures

PHASE DIAGRAM FOR C-H-O SYSTEM

PROCESS FOR FORMING HYDROGEN AND OTHER FUELS UTILIZING MAGMA

FIELD OF THE INVENTION

The invention relates to production of fuel from geothermal sources and more particularly to production of hydrogen utilizing water and magma.

BACKGROUND OF THE INVENTION

The petrochemical resources within the earth are being rapidly depleted in order to supply fuel for use by man in industry, transportation, and home heating and lighting. There has been an increased awareness of mankind's energy dependence and of the need to conserve and extend present energy resources. Problems of how to develop and utilize alternatives to the energy sources in use at present now exist. Several possible solutions are provided by nuclear, solar, wind and geothermal energy technologies. Solar and wind devices are typically not fuel producing. Fissile nuclear fuels, while still in adequate supply, are of finite quantity. The most urgent problem appears to be how can an alternate fuel, useable by present technology devices, which is durable and portable and which may also serve as a feedstock in the production of chemicals, be produced?

Hydrogen may be such a fuel. It may be utilized not only as a fuel but as a primary energy carrier or as a feedstock. The immediate problem with hydrogen is that there has been no practical economical manner of producing hydrogen in sufficient quantities to satisy human needs.

SUMMARY OF THE INVENTION

In accordance with the present invention there is provided a process for extracting hydrogen from magma and water comprising injecting water from above the earth's surface into a pocket of magma, the magma being within a suitable temperature range, reacting the water with the magma to produce hydrogen, and extracting the hydrogen produced by the water-magma reaction from the vicinity of the magma.

One object of the present invention is to provide hydrogen in adequate quantities to serve as a fuel for widespread use.

Another object of the present invention is to produce fuels from geothermal sources thereby conserving petrochemical reserves for the production of plastics, chemicals and lubricants.

One advantage of the present invention is that the fuel produced thereby can be transported and stored.

Another advantage of the instant invention is that in accordance therewith readily available resources can be used to produce valuable fuels.

BRIEF DESCRIPTION OF THE DRAWINGS

Other objects and advantages of the instant invention will be apparent to those skilled in the art from the following description with reference to the appended drawings wherein like numbers denote like parts and wherein.

DETAILED DESCRIPTION OF THE INVENTION

Fuels formed in accordance with the present invention comprise reducing molecules such as $H_2$, CO, $CH_4$, $C_6H_6$, $C_2H_2$. Such fuels may be formed by utilizing magma or hot rock injected with water with or without appropriate additives. Much of the reducing capability of either solid or liquid rocks results from their ferrous iron content. Hence, if water is contacted with such hot rocks or magma, hydrogen will be produced as the iron converts from the ferrous to the ferric state. A reducing environment may also be utilized to yield carbon monoxide, methane and other hydrocarbons if the concentration of carbon species from additives or otherwise is sufficient. Additives to the water such as biomass, carbon, salts and the like may be used to maintain optimum fuel production or to provide maximum overall production economy. Fuels can be produced from both solid rock and magma, the latter having the advantage of higher temperatures offering increased reaction rates. In addition, the fluidity of magma makes possible interactions of larger volumes of continuous reactants. Magma also provides a large available reservoir of heat and reducing material to further assist in the production of fuel.

A very common rock, basalt, is capable of converting from about 0.5 to about 7% of water injected therein into hydrogen. This variance depends upon the oxidation state of the substances within the rock which varies with rock temperature. At magmatic temperatures which range from about 1000° C to 1300° C, basalts typically have oxidation-reduction states which range from those similar to magnetite-wustite which can provide up to about 7% hydrogen, to nickel-nickel oxide which can provide up to about 0.5% hydrogen. Most basalts have reduction capacities roughly equivalent to the assemblage quartz-magnetite-fayalite which can provide about 2.5% hydrogen when interacted with water within the above noted temperature range.

Many magmatic sites exist in the continental United States and Hawaii as well as world wide. A site selected for magmatic fuel production should have an adequate supply of water in addition to reducing magma or rock. Therefore, oceanic locations appear to be highly satisfactory. Mid-oceanic ridges in both the Atlantic and Pacific are potential magmatic fuel sources.

The temperature of the rock utilized is important and in general, temperatures above 400° C are necessary for sustained fuel production unless the reaction is assisted by catalysts. Temperatures in this range are typically encountered at depths of from 35,000 to 45,000 feet in regions of average terrestrial heat flow but at considerably shallower depths in areas of recent volcanic or intrusive igneous activity.

Figure 1:
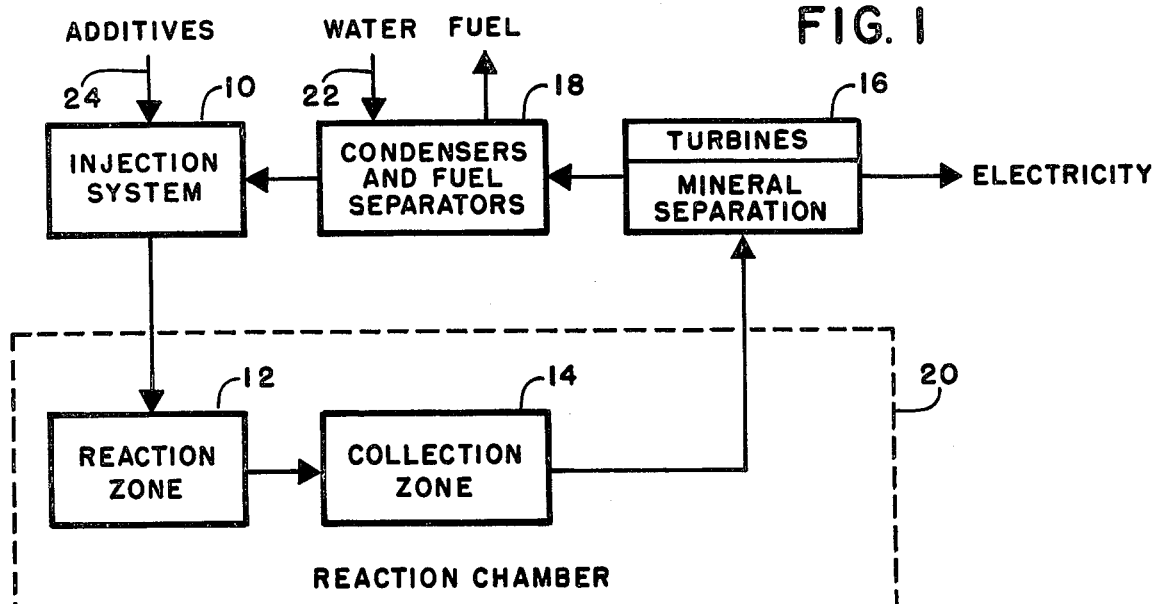
FIG. 1 illustrates a block diagram of a process in accordance with the present invention.

A basic magmatic fuel production system, seen in FIG. 1, comprises an injection system 10, a reaction zone 12, a collection zone 14, turbines and mineral separation 16 and condensers and fuel separators 18. The reaction zone 12 and collection zone 14 are disposed within a reaction chamber 20 as seen in FIGS. 2a, 2b, 3a and 3b in more detail. Water is injected through inlet 22 and passes through the injection system 10. Additives may be added through an inlet 24. The water or water with additives is injected into the reaction zone 12 in which the chemical reactions hereinafter described occur. Products of the reaction such as the fuels, together with the unreacted steam, are collected within the reaction chamber 20 at collection zone 14 from which they are carried to a separation stage where minerals as well as other unwanted or useful byproducts such as $CO_2$ may be separated from the fuels. The fuels obtained as well as unreacted steam may, for example, be used to run turbines to generate electricity.

Figures 2A, 2B:
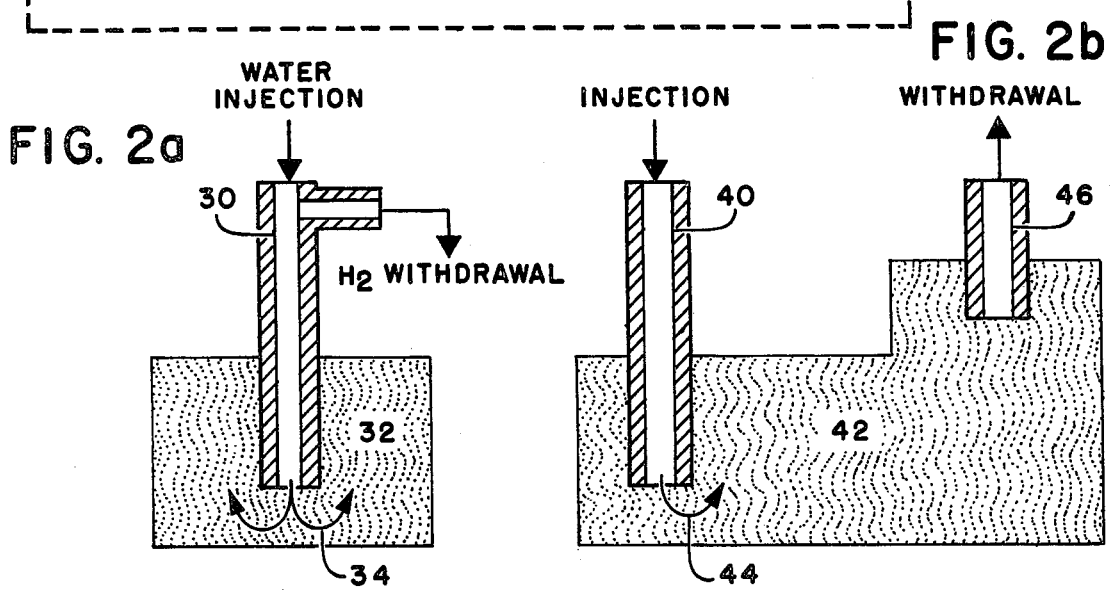
FIGS. 2a and 2b show extraction structures for solid rock.

Reference is now made to FIGS. 2a and 2b. Hot solid rock may be drilled and water with or without additives may then be injected through a tube or orifice 30 into a chamber 32 in the hot rock so that a reaction occurs in a region 34 thereof. Reaction products are withdrawn through an external tube disposed about tube 30. Alternatively, water may be injected through an injection tube 40 into reaction region 44 in a chamber 42. Reaction products may then be withdrawn through an outlet 46 located remotely from injection tube 40.

Standard drilling techniques well known to those of ordinary skill in the art may be utilized in drilling into many hot rocks. As rock temperatures increase beyond the capability of conventional drill bits, high temperature rock penetrators such as Subterrene developed by the Los Alamos Scientific Laboratory and disclosed in U.S. Pat. Nos. 3,357,505, 3,693,731 and 3,881,777 all assigned to the United States Government as represented by United States Energy Research and Development Administration, may be used. Reaction chambers in solid rock may comprise a series of natural fractures or a hydrofractured lens. If hydrofracturing is used the size and configuration of the reaction chamber may be predetermined and controlled. Detrimental fissures can be closed by suitable grouting. Fuel production in a hydrofracture chamber is restricted by the amount of hot reactive surface available, so the reaction zone may be extended by leaching processes, explosive fracturing or coolant induced thermal fracturing.

It will be appreciated by those skilled in the art that it is important to construct well-cased holes for these applications to minimize well blow-out problems and process fluid leakage. Techniques for blow-out prevention using casing methods and blow-out preventers practiced by the oil industry may be used.

Standard techniques well known to those of ordinary skill in the art are also useful in drilling into high temperature regions near molten rock. As in the case of solid rock, if the temperature is too high for such techniques, Subterrene drilling, mentioned hereinbefore, may be used.

The reaction chamber itself comprises downhole injection plumbing, the volume of the material undergoing interaction, the volume of material which contains the products of the interaction, the volume where gas collection is occurring and downhole plumbing associated with the upstreaming gases going to mineral separation units and turbines. Downhole injection plumbing usually comprises a fuel generation system containing a heat exchanger which preheats liquid to be injected. Heat for the heat exchanger is obtained from hot solid rocks. In the case of a molten rock reaction chamber, the final preheat is obtained from the molten rock itself. In magma, the injected material is directed by nozzles so as to stimulate movement of liquid rock, thereby increasing thermal transport to the heat exchanger and to the reaction zone. This also increases the supply of fresh molten rock. As water is injected into magma some of it goes into solution and the dissolved water decreases the viscosity and lowers the melting range temperature of the magma to increase the rate at which bubbles rise to the gas collection region.

In liquid rock the gas must be confined prior to extraction. This may occur naturally due to the configuration of the magma chamber or a sealing end boundary wall may need to be formed about the chamber. Explosive charges and the like may be used to produce cavities at the top of the magma chamber for collection of the gases.

Figure 3A:
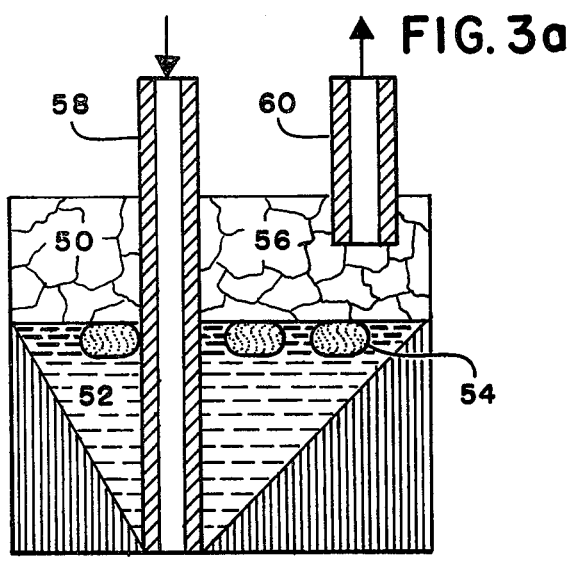
FIGS. 3a and 3b illustrate exemplary extraction structure embodiments for liquid rock.

As shown in FIG. 3a, a chamber 50 contains liquid foam 52 containing gas pockets 54 beneath a fractured solidified foam 56. Water with or without additives is injected through a tube 58 and hydrogen gas or other fuel produced is extracted via outlet 60. Gas fuel is separated from the liquid utilizing the foam layer 56, the upper section of which is solid. Gas accumulates at the solid-liquid foam interface and is extracted by fracturing the solid foam which acts as a filter for the liquid rock and allows the gas to escape through the extraction tube 60. This fracturing may occur naturally or be produced explosively by using, for example, shrapnel or by back-pressuring the system.

Figure 3B:
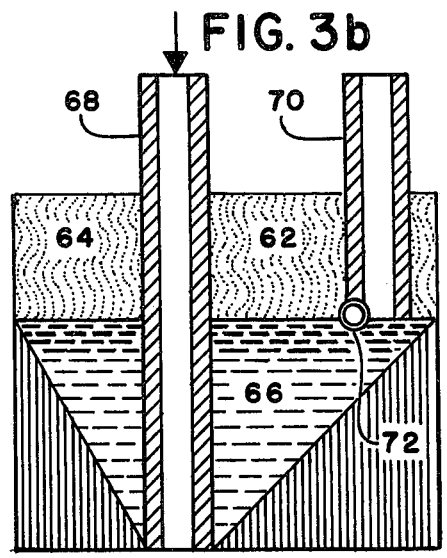

Alternatively as shown in FIG. 3b, the gas may be extracted from a pocket 62 in a chamber 64 where it accumulates above molten rock 66. Water with or without additives is injected through an inlet 68 and gas produced is extracted through an outlet 70 which is maintained a proper amount above magma 66 by, for example, a liquid level sensor 72. In both the FIGS. 3a and 3b systems, those skilled in the art will appreciate that it is important that both the downhole injection and extraction systems be well cased to prevent a well blow-out. The casings should be designed to tolerate both high temperature environments and exposure to caustic and corrosive gases.

When steam reacts with ferrous iron in magma or hot rocks, hydrogen is produced by one or more of a plurality of reactions. These reactions are exemplified by but are not limited to the following:

$$2\ FeO + H_2O \rightarrow Fe_2O_3 + H_2 \uparrow$$

$$Fe_2SiO_4 + H_2O \rightarrow Fe_2O_3 + SiO_2 + H_2 \uparrow$$

Injection nozzles direct gas flow for optimum reaction and collection. The composition of the reacting fluid can be modified to extend the reducing lifetime of the reaction zone, to optimize the fuel producing reaction or to alter the physical and chemical characteristics of the reaction zone so as to produce products which have high commercial value. Additives can be added to the water to decrease the corrosive reaction behavior on downhole components and the like.

Biomass can be added to the water to decrease the oxygen fugacity of the injected fluid and produce fuels in a reaction zone without relying on the presence of iron in the magma.

Several chemical reactions are possible between water and biomass reactants in a magma chamber. For example, if cellulose is added to the injection stream, the reaction is:

$$C_6H_{10}O_5 + H_2O \rightarrow H_2\uparrow + CH_4\uparrow + CO_2\uparrow + CO\uparrow$$

where the ratios of the reactant products are determined by the pressure and temperature in the magma chamber.

A plurality of other biomass molecules can be reacted with water in the magma chamber to produce fuel gases.

Another function which can be performed by the addition of biomass is the rejuvenation of an exhausted magma by reconverting the ferric iron to its ferrous state.

The reaction rates and solubility of materials in the upstreaming gases can be controlled to some extent by modifying the composition of the materials in the reaction zone.

Figure 4:
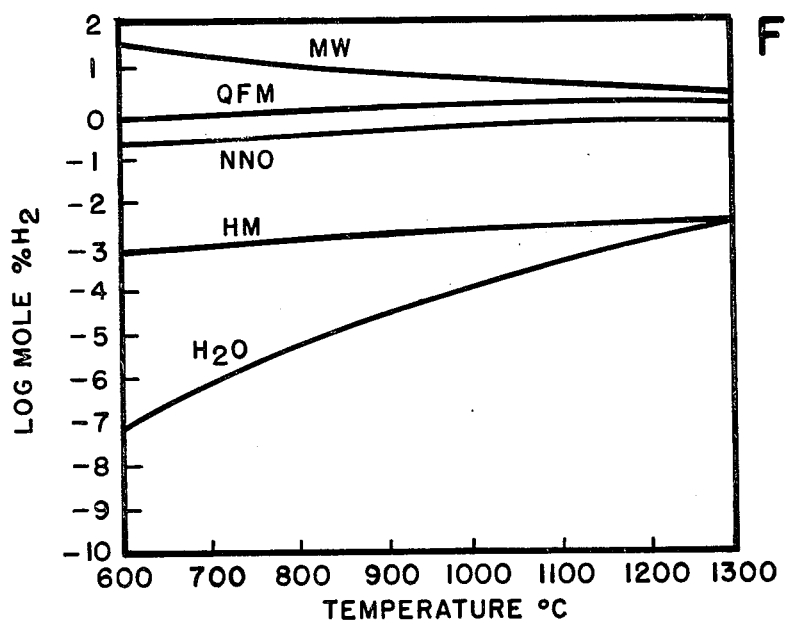
FIG. 4 graphically depicts hydrogen concentrations resulting from the equilibration of water with various solid assemblages.

FIG. 4 shows hydrogen concentrations resulting from the equilibrations of water with various solid assemblages for a total pressure of 100 MPa (1000 bars), a reasonable value for basalt at shallow depths as, for example, under mid-ocean ridges. The results are presented in $\log_{10}$ mole percent hydrogen for the temperature range of from 600° C to 1300° C, which includes the solidus to liquidus region for most magmas at such pressure. The curve labeled $H_2O$ refers to the percent hydrogen generated by the thermal dissociation of water. Hydrogen concentrations are mainly determined by temperature and oxygen fugacity, although a pressure increase from 0.1 MPa (1 bar) to 100 MPa causes a decrease of about 0.25 percent $H_2$ in the region of nickel-nickel oxide and quartz-fayalite-magnetite for most temperatures. Hydrogen concentrations for systems with oxygen fugacities near nickel-nickel oxide and quartz-fayalite-magnetite range from about 0.5 to 2.5 percent. Hydrogen fugacities in this region range from 2.1 MPa (21 bars) to 0.3 MPa (3 bars) at 100 MPa (1000 bars) total pressure. Before eruption and post-eruption oxidation, most basaltic magmas probably have oxygen fugacities equal to or somewhat less than quartz-fayalite-magnetite. Therefore, hydrogen concentrations of 3 percent are possible from typical water-basalt interactions. Mole fractions of hydrogen have been experimentally measured in a vessel containing crushed Hawaiian basalt containing 10.5% FeO and 1.5 w/o $FeO_{1.5}$ and water vapor. The observations are recorded in Table 1 as a function of total pressure. The observed production of 1 to 3 mole percent hydrogen is in good agreement with that expected from calculations for this rock with an anticipated oxygen fugacity between that of the quartz-fayalite-magnetite and nickel-nickel oxide buffers.

TABLE 1 comparison of observed vs. predicted hydrogen concentrations produced by basalt-water interactions
BASALT + $H_2O$ 950° C

| TOTAL PRESSURE MPa | MOLE PERCENT $H_2$ PRODUCED | MOLE PERCENT $H_2$ CALCULATED | |
|---|---|---|---|
| | | NNO | QFM |
| $1.3 \times 10^{-3}$ | 1.1 | 0.65 | 2.1 |
| $2.6 \times 10^{-4}$ | 2.3 | 0.65 | 2.1 |
| $1.3 \times 10^{-4}$ | 2.7 | 0.65 | 2.1 |

Figure 5:
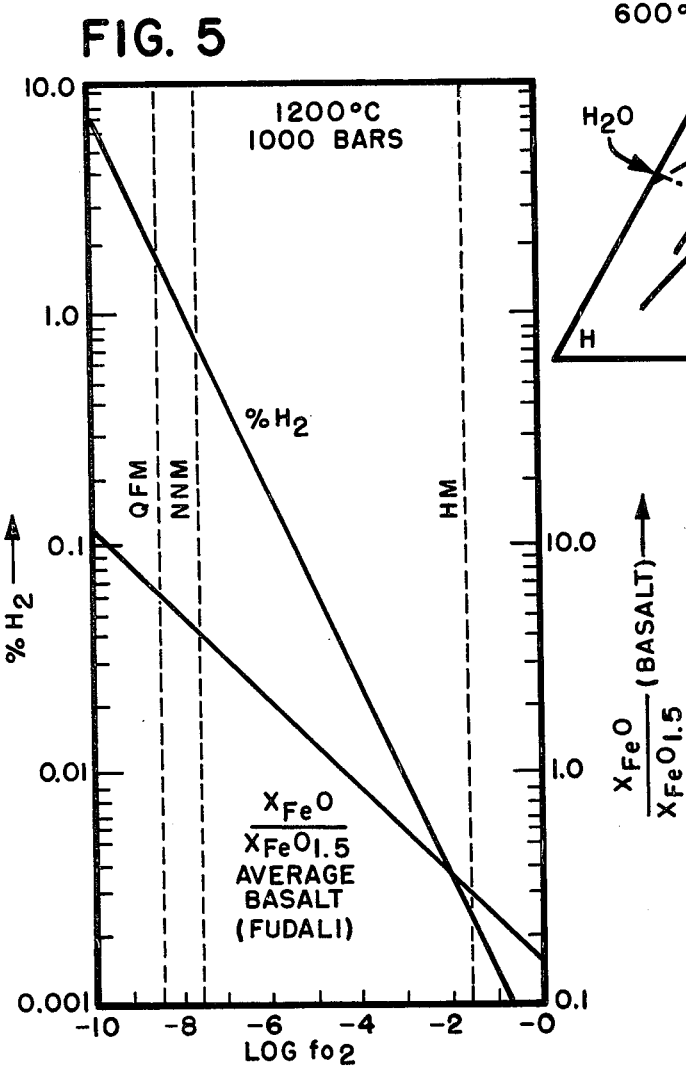
FIG. 5 is a plot of equilibrium hydrogen concentration and the ratio of the ferrous to ferric iron as a function of oxygen fugacity for water-basaltic magma interaction.

These calculated and experimental hydrogen concentrations apply at initial conditions in which the ratio of water to basalt is small and the basalt efffectively buffers the fluid. In a water rich system the basalt becomes progressively oxidized and a continual addition of water ultimately converts most of the FeO to $FeO_{1.5}$. However, before oxidation is complete the hydrogen concentration drops to levels which would probably make recovery impractical. The quantity of hydrogen potentially recoverable up to some practical oxidation limit can be established by those skilled in the art from experimental data on the $FeO:FeO_{1.5}$ ratio of basalts as a function of oxygen fugacity at 1200° C. The average for this mole fraction ratio in experiments on basaltic lavas is represented by the lower line in FIG. 5 which is computed using data from R. F. Fudalis, Geochemica et Cosmochemica Acta 29, 1063 (1965).

Fresh basalt containing on the order of 10 weight percent FeO at a temperature near 1200° C with an oxygen fugacity one half order of magnitude less than quartz-fayalite-magnetite provides a corresponding $X_{FeO}:X_{FEO_{1.5}}$ ratio of 7.4 and a weight percent $FeO_{1.5}$ of 1.5. As oxidation proceeds, new values for the ratio of $FeO$ to $FeO_{1.5}$ can be calculated using FIG. 5.

Table 2 summarizes reaction progress from the initial condition to a point where only 0.01 percent hydrogen is compatible with the oxidation state of basalt. The cumulative hydrogen production from the oxidation of a given volume of basalt can be calculated from the above oxidation reaction, progressive values for the mass of FeO oxidized, and an assumed basalt density $3g/cm^3$. The results of such calculations in units of moles of hydrogen per $km^3$ basalt oxidized are shown in Table 2.

TABLE 2 hydrogen yields for progressive oxidation of basalt by interaction with water

| $Log_{10}fo_2$ | $\dfrac{X_{FeO}}{X_{FeO_{1.5}}}$ | Mole % $H_2$ | $\dfrac{\text{Moles } H_2}{Km^3 \text{ Basalt}}$ |
|---|---|---|---|
| −9. | 7.4 | 3. | 0. |
| −8. | 4.8 | 1.2 | $1.3 \times 10^{11}$ |
| −7. | 3.2 | .45 | $3 \times 10^{11}$ |
| −6. | 2. | .17 | $5.5 \times 10^{11}$ |
| −5. | 1.3 | .07 | $8 \times 10^{11}$ |
| −4. | .9 | .025 | $1 \times 10^{12}$ |
| −3. | .58 | .01 | $1.3 \times 10^{12}$ |

Hydrogen production estimates with reaction progress presented in Table 2 apply only at 1200° C. Lower temperatures resulting from the cooling effect of injected water may permit a greater amount of FeO to be oxidized and hence, greater hydrogen production because decreased temperature favors lower $FeO:FeO_{1.5}$ ratios in basalts. However, association of hydrogen and oxygen to form water within the fluid phase as temperature decreases will tend to decrease hydrogen concentrations. Also, lower temperatures may lead to less favorable kinetics for the oxidation process. It can be seen from Table 2, that about $10^{12}$ moles of hydrogen [$2 \times 10^{12}$ grams or 20 $km^3$ at standard temperature and pressure (S.T.P.)] of hydrogen are potentially recoverable from water interaction with one $km^3$ of basalt at high temperatures. A minimum of $10^{12}$ moles of water would be required because this amount would be consumed in oxidation of the ferrous iron. It can be calculated from Table 2 that a maximum of $7 \times 10^{14}$ moles of water as a working fluid would be needed to produce this quantity of hydrogen although considerably less water could be used if the unreacted water were recycled. Therefore, approximately $10^{13}$ moles is a reasonable upper limit for water consumption in the production of $10^{12}$ moles from a km³ of basalt. The addition of $10^{13}$ moles of water at 25° C to a km³ of basalt at 1200° C cools the rock only about 50° C.

Those skilled in the art will appreciate that biomass may be added to the working fluid in an advantageous manner when a practicable source of such material is available. This makes possible either the refining of low grade fuel in the form of biomass or the extraction of fuel from otherwise useless biomass. It also provides other fuel gases such as carbon monoxide and methane. Mixtures of water with small percentages of biomass material, by themselves reducing, decrease the consumption of FeO and $H_2O$ per unit of fuel generated. It can readily be seen that the addition of small percentages of these components to the working fluid provide for fuel production from less FeO-rich andesitic and rhyolitic magmas. Calculated results are presented herein for the addition of one common form of biomass, cellulose ($C_6H_{10}O_5$) to the injection fluid assuming no reducing action by the magma. Cellulose is one of the principal constituents of plant material and is available in a variety of substances such as seaweed, bagasse, municipal sewage, forest slash and the like.

Figure 6:
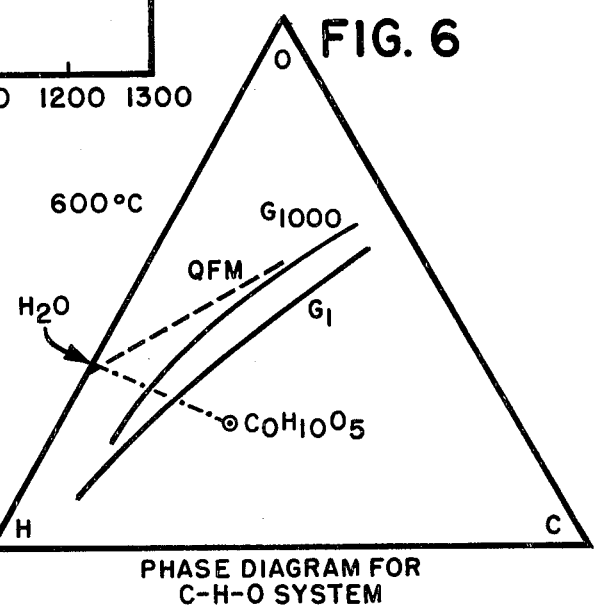
FIG. 6 illustrates the properties and compositional relationships for injection fluid mixtures of water and cellulose at 600° C.

FIG. 6 illustrates properties and compositional relationships for injection fluid mixtures of water and cellulose at 600° C. All composition lines are unchanged up to 1300° C except for lines $G_{0.1}$ and $G_{100}$ hereinbelow discussed. The line joining $H_2O$ and $C_6H_{10}O_5$ represents the locus of atomic compositions ranging from 100 percent water to 100 percent cellulose. $G_{0.1}$ and $G_{100}$ represent the graphite phase boundaries at 0.1 MPa and 100 MPa respectively. Compositions along the line labeled QFM have oxygen fugacities equivalent to the assemblage quartz-fayalite-magnetite at 100 MPa. This line is nearly unchanged with respect to atomic composition over the temperature range 600° to 1300° C. A large proportion of cellulose brings the mixture composition near lines $G_{100}$ and $G_{0.1}$ which are the calculated 600° C phase boundaries for graphite precipitation at 100 MPa and 0.1 MPa, respectively, and which limit the equilibrium concentration of the cellulose component for homogeneous working fluid in this pressure range. At higher temperatures, larger cellulose concentrations are possible before graphite precipitation occurs. Other oxygen fugacity isobars than the ones shown in FIG. 6 are roughly parallel to this line, those which are more oxidizing occurring above the line and those more reducing occurring below the line. FIG. 6 thus shows that even for relatively water-rich mixtures, water-cellulose fluid compositions have oxygen fugacities lower than quartz-fayalite-magnetite and are therefore more reducing than most magmas or hot rocks.

Figure 8:
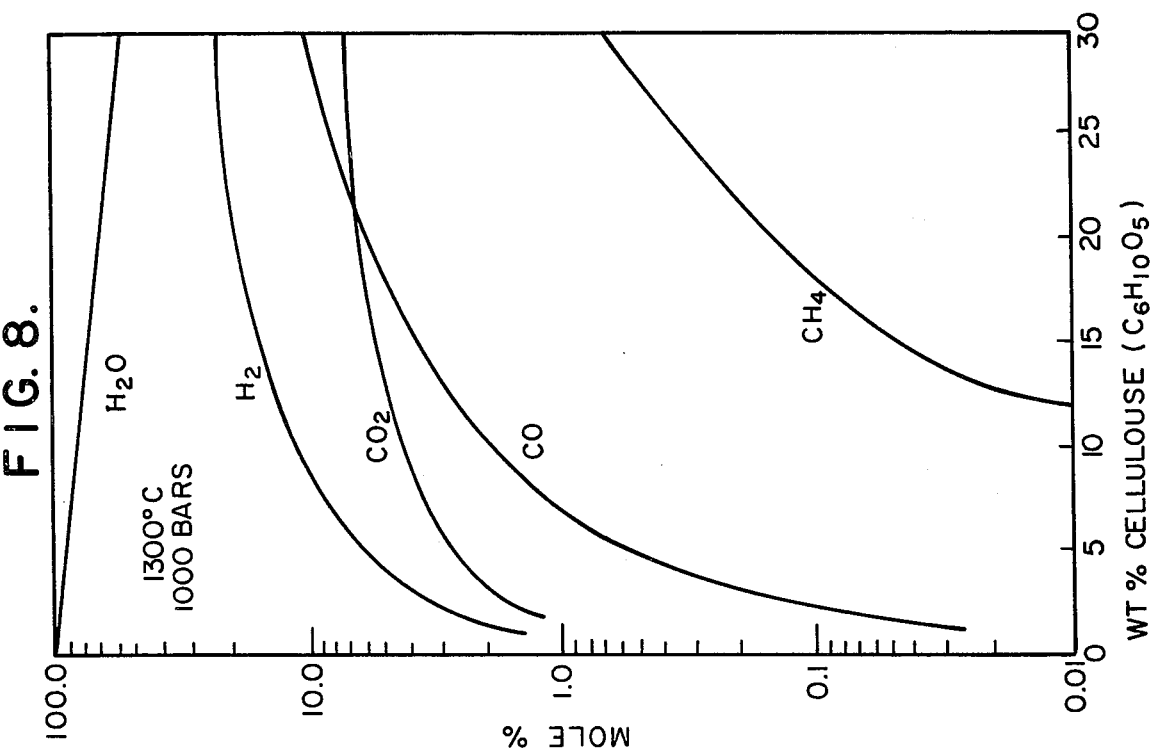
FIG. 8 graphically depicts equilibrium distribution at 1300° C of reaction products for cellulose and water mixtures.
Figure 7:
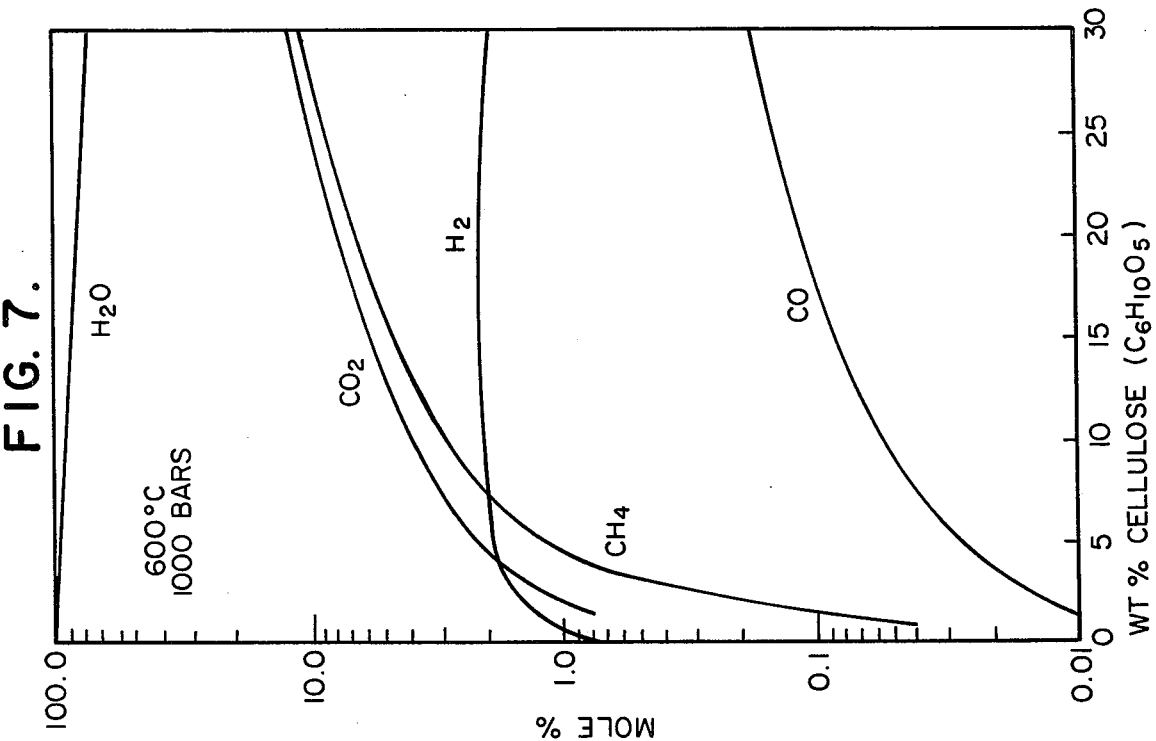
FIG. 7 shows equilibrium distribution at 600° C of reaction products for cellulose and water mixtures.

FIGS. 7 and 8 summarize the concentrations of principal fluid species in mole percent for fluids along the $H_2O-C_6H_{10}O_5$ mixing line in FIG. 6 at 100 MPa and temperatures of 600° C and 1300° C at bulk compositions where graphite is not a stable phase. At 600° C, hydrogen concentrations level out at 2 mole percent after the addition of 3 weight percent cellulose. With the addition of larger proportions of cellulose, methane generation predominates over hydrogen. At temperatures greater than 800° C such as seen in FIG. 8, fluid equilibria shift toward larger hydrogen and carbon monoxide concentrations. Thus, mixtures of water with a few weight percent cellulose in a closed system loop heated by magma or hot rock produce hydrogen and methane at lower temperatures and hydrogen and carbon monoxide at higher temperatures.

If mixtures of water and cellulose are interacted directly with reducing magma or hot rock, the magma tends to alter the injection fluid composition towards a magmatic oxygen fugacity. For example, basalt reacts with the fluid giving rise to hydrogen concentrations similar to those obtained from water-basalt interactions. Some carbon monoxide and methane may also be produced depending on the concentration of the cellulose component. After sufficient quantity of fluid has circulated, the injected fluid will buffer the magma and fuel production will stabilize near values indicated by FIGS. 7 and 8 for appropriate temperature and fluid composition. Probably the most significant aspect of the addition of small percentage amounts of cellulose to water is its reducing effect on the resulting fluid. One weight percent cellulose in water results in oxygen fugacities as low as quartz-fayalite-magnetite at 1200° C and in lower oxygen fugacities at temperatures less than 800° C. Small cellulose additions to working fluid will prolong and increase the potential fuel recoverable from magma or hot rock of any composition relative to that obtained using water alone.

The various features and advantages of the invention are thought to be clear from the foregoing description. However, various other features and advantages not specifically enumerated will undoubtedly occur to those versed in the art, as likewise will many variations and modifications of the embodiments illustrated herein, all of which may be achieved without departing from the spirit and scope of the invention as defined by the appended claims.

We claim:

1. A process for producing hydrogen from water and underground magma comprising: drilling at least a single hole from the surface of the earth to a pocket of underground magma, pumping water from above the surface of the earth down through a said hole into the pocket of magma, the magma being between about 600° and about 1300° C; reacting the water with the magma to produce hydrogen; and conducting the resulting hydrogen produced from the vicinity of the magma to the surface of the earth through a said hole.

2. The invention of claim 1 further comprising adding biomass to the water prior to or during pumping the water into the pocket of magma to form simultaneously with said hydrogen at least one other fuel.

3. The invention of claim 1 further comprising adding salts to the water prior to or during pumping the water into the pocket of magma.

4. The invention of claim 1 further comprising adding carbon to the water prior to or during pumping the water into the pocket of magma to form simultaneously with said hydrogen at least one other fuel.

5. A process for producing hydrogen from water and hot solid rock below the surface of the earth comprising: drilling at least a single hole from the surface of the earth into a formation of hot solid basalt rock, pumping water from above the surface of the earth down through said hole into said formation of hot rock, the hot rock having a temperature within the range of from about 400° C to a temperature just less than about its solid-liquid change of state temperature; reacting the water with the hot rock to produce hydrogen; and conducting the hydrogen from the vicinity of the hot rock to the surface of the earth through a said hole.

6. The invention of claim 5 further comprising adding biomass to the water prior to or during pumping the water into the pocket of magma to form simultaneously with said hydrogen at least one other fuel.

7. A process for producing hydrogen from basaltic liquid and solid ferrous iron containing hot rocks comprising: drilling at least a single hole from the surface of the earth to said hot rocks, the hot rocks having a temperature within the range of from about 400° C to a temperature just less than about their solid-liquid change of state temperature pumping water into the hot rock to cause at least the following ferrous to ferric iron reactions to occur:

$$2 FeO + H_2O \rightarrow Fe_2O_3 + H_2 \uparrow$$

$$Fe_2SiO_4 + H_2O \rightarrow Fe_2O_3 + SiO_2 + H_2 \uparrow ; \text{ and}$$

conducting the hydrogen formed to the surface of the earth through a said hole.

8. The invention of claim 7 further comprising adding biomass to the water prior to or during pumping to reconvert the ferric iron to its ferrous state.

* * * * *